United States Patent
Lindberg et al.

(10) Patent No.: US 7,417,343 B2
(45) Date of Patent: Aug. 26, 2008

(54) BEARING SURFACE LAYER FOR MAGNETIC MOTOR

(75) Inventors: Paul M Lindberg, San Diego, CA (US); Philip G. Hollingsworth, La Jolla, CA (US); James Carl Ellard, San Diego, CA (US); Leonard N. Wedman, Santa Barbara, CA (US)

(73) Assignee: California Linear Devices, Inc., Carlsbad, CA (US)

( * ) Notice: Subject to any disclaimer, the term of this patent is extended or adjusted under 35 U.S.C. 154(b) by 0 days.

(21) Appl. No.: 10/500,259

(22) PCT Filed: Jan. 25, 2002

(86) PCT No.: PCT/US02/02300

§ 371 (c)(1),
(2), (4) Date: Jun. 25, 2004

(87) PCT Pub. No.: WO03/065554

PCT Pub. Date: Aug. 7, 2003

(65) Prior Publication Data

US 2005/0006971 A1    Jan. 13, 2005

(51) Int. Cl.
*H02K 7/08* (2006.01)
(52) U.S. Cl. .................................... 310/90; 310/12
(58) Field of Classification Search ............ 310/12–14, 310/90.5, 156.08, 156.09, 156.11, 156.15, 310/156.23, 156.28, 156.29, 156.36, 90
See application file for complete search history.

(56) References Cited

U.S. PATENT DOCUMENTS

| | | | | |
|---|---|---|---|---|
| 3,149,255 A * | 9/1964 | Trench | ......................... | 310/30 |
| 3,614,181 A * | 10/1971 | Meeks | ........................ | 310/90.5 |
| 3,852,627 A * | 12/1974 | Davis | .......................... | 310/13 |
| 4,379,598 A * | 4/1983 | Goldowsky | ................ | 310/90.5 |
| 4,439,699 A * | 3/1984 | Brende et al. | .................. | 310/13 |
| 4,868,431 A | 9/1989 | Karita et al. | | |
| 5,097,167 A | 3/1992 | Kanayama et al. | | |
| 5,134,331 A * | 7/1992 | Miyaji et al. | ................... | 310/90 |
| 5,159,219 A * | 10/1992 | Chu et al. | ................... | 310/90.5 |
| 5,220,232 A * | 6/1993 | Rigney et al. | .............. | 310/90.5 |
| 5,452,520 A * | 9/1995 | Raj et al. | ................. | 33/366.18 |
| 5,734,209 A * | 3/1998 | Hallidy | ........................ | 310/12 |
| RE36,202 E * | 4/1999 | Hajec | .......................... | 310/90 |
| 5,909,066 A * | 6/1999 | Nanba et al. | .................. | 310/12 |
| 6,157,100 A * | 12/2000 | Mielke | ........................ | 310/13 |
| 6,229,243 B1 * | 5/2001 | Roesel et al. | ............... | 310/261 |
| 6,262,507 B1 * | 7/2001 | Sato et al. | .................... | 310/152 |
| 6,265,801 B1 * | 7/2001 | Hashiba et al. | ............. | 310/214 |
| 6,424,068 B2 * | 7/2002 | Nakagishi | .................. | 310/90.5 |
| 6,531,801 B1 * | 3/2003 | Blazek et al. | ............... | 310/261 |

(Continued)

FOREIGN PATENT DOCUMENTS

JP    1986-61-221561    10/1986

(Continued)

*Primary Examiner*—Dang D Le
(74) *Attorney, Agent, or Firm*—Goodwin Procter LLP

(57) ABSTRACT

Magnetic motor component sleeves (209) for motor components with the sleeves (209) having various helpful magnetic characteristics, such as high magnetic permeability; magnetic saturation; residual (or remanent) magnetization; anisotropic magnetic properties. Method for making a magnetic linear motor shaft (202), including thermal treatment to temporarily change the dimensions of various shaft components to allow tight assembly.

21 Claims, 7 Drawing Sheets

U.S. PATENT DOCUMENTS 6,765,328 B2 * 7/2004 Razzell et al. ............. 310/90.5
6,812,598 B2 * 11/2004 Cheung et al. ................ 310/30

FOREIGN PATENT DOCUMENTS

| JP | 1988-63-217965 | 9/1988 |
| JP | 1997-09-182408 | 7/1997 |
| JP | 1998-10-051986 | 2/1998 |
| JP | 1998-10-290560 | 10/1998 |
| JP | 2001-090660 | 4/2001 |
| JP | 2001-095225 | 4/2001 |

* cited by examiner

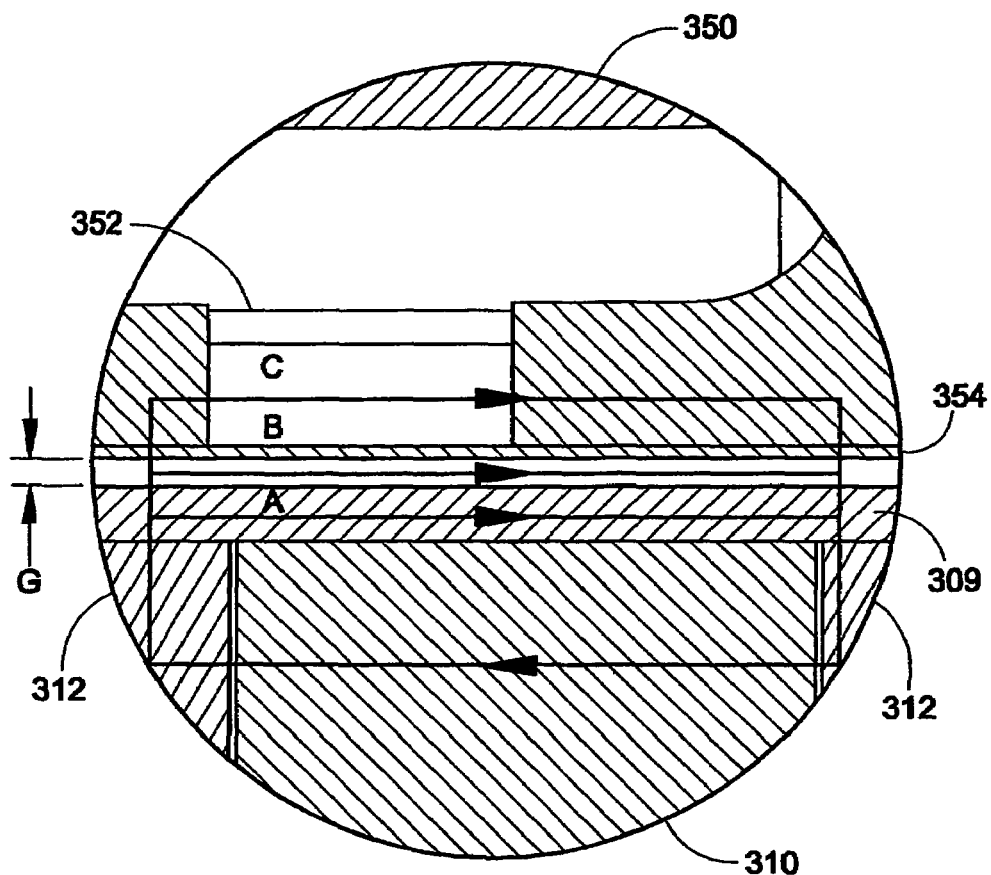
FIG. 8
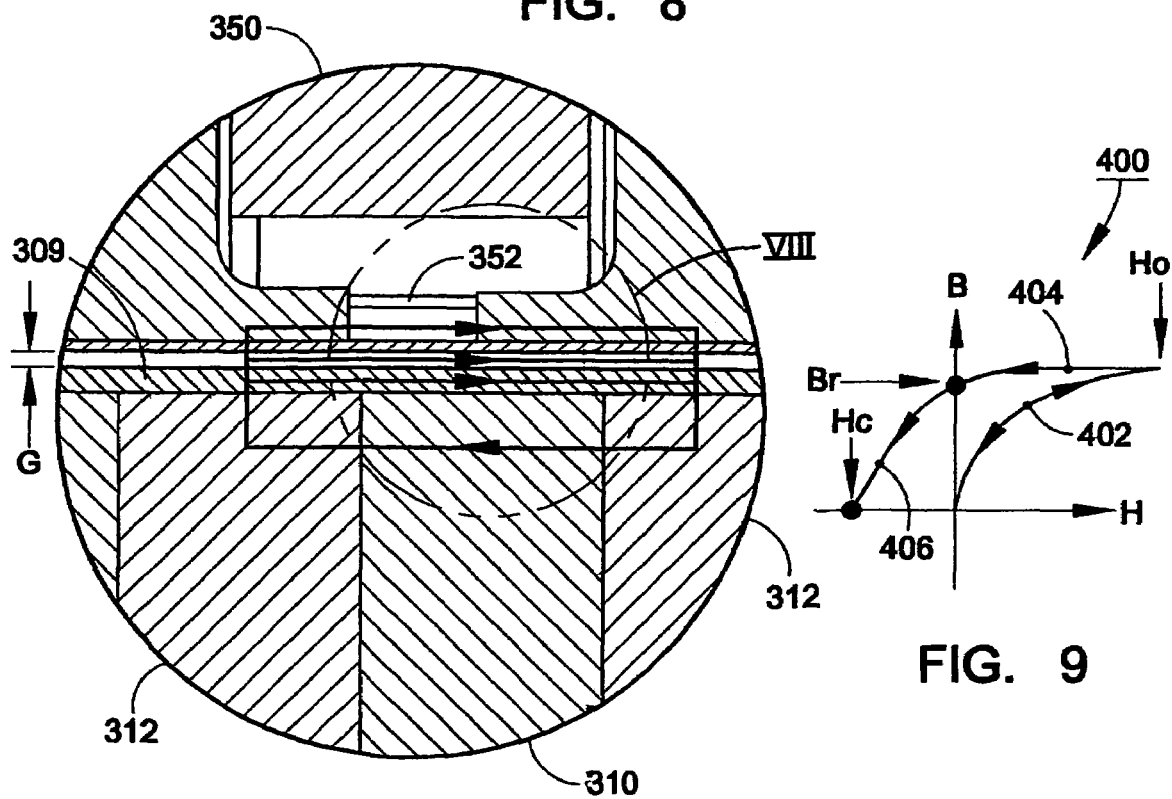
FIG. 7
FIG. 9

BEARING SURFACE LAYER FOR MAGNETIC MOTOR

FIELD OF THE INVENTION

The present invention is directed to the construction of magnetic motors, and more particularly to shafts for use in linear motors, and even more particularly to shaft sleeves for doubly salient linear, magnetic motors.

BACKGROUND OF THE INVENTION

Generally speaking, a conventional magnetic motor includes two pieces that move relative to each other. Each of the two pieces includes some means of generating a magnetic field. The interaction between the magnetic fields generated by each of the pieces forces the pieces to move relative to each other. Usually, the magnetic field of at least one of the pieces will be selectively adjusted over time so that, as the relative spatial relationship of the pieces changes over time, the magnetic fields of the respective pieces will continue to interact to continue to activate relative motion in a desired direction.

Usually at least one of the pieces of the magnetic motor will employ one or more electromagnet(s), such as an electromagnetic coil, to generate its magnetic field(s). By using an electromagnetic piece, the timing of current supplied to the electromagnet(s) can be used to control the direction and strength of the magnetic fields with respect to time. By carefully controlling the electromagnetic piece's magnetic field as its counterpart piece moves, the magnetic field will pull and/or push the two counterpart pieces into relative motion. As the counterpart pieces continue in their relative motion, the direction and/or magnitude of the current in the electromagnet(s) can be changed so that the new magnetic field of the electromagnet(s) will continue to force the desired relative motion.

There are various geometries for magnetic motors. One popular geometry is the rotary motor. In the rotary motor, a rotor piece is driven to rotate relative to a stator piece. Although the scope of the present invention may include rotary motor embodiments, this document is primarily concerned with another popular conventional magnetic motor called the linear magnetic motor. Linear magnetic motors include a stator piece, and a shaft member that is driven to move linearly (that is, as a straight line translation) with respect to the stator piece.

More particularly, this document is primarily concerned with linear magnetic motors wherein an elongated shaft member: (1) is at least partially surrounded by the stator, and (2) is constrained to move linearly within the stator by a bearing. (Generally the bearing housing and stator are fixed relative to each other and can therefore be thought of as a subassembly.) As will be seen from the prior art embodiment described below, it is difficult to make a shaft that simultaneously: (1) performs well magnetically; and (2) performs well with respect to wear at the bearing.

FIGS. 1 and 2 show typical prior art linear magnetic motor 100, including shaft 102, stator 104 and bearings 106. Shaft 102 generates magnetic fields by virtue of having a series of built-in permanent magnets 110. Stator 104 generates magnetic fields through a series of annular magnetic coils 105. By timing the flow of current in the coils with respect to the position and/or momentum of shaft 102, the interaction of magnetic forces from the shaft and from the stator will actuate the shaft to move. More particularly, the shaft is constrained, by bearings 106, to move linearly in the direction of arrow D.

FIG. 2 shows a more detailed view of shaft 102 and one of the magnetic fields that it generates. Shaft 102 includes sleeve 109, annular, permanent magnet 110, pole pieces 112 and core 114. In this assembly, maximizing the magnetic force on the shaft will tend to advantageously maximize the thrust of the linear motor. In order to maximize the magnetic force on the shaft, the magnetic field of permanent magnet 110 should cause as much magnetic flux density as possible linking stator 104 and shaft pole pieces 112.

There are several variables that control the magnitude of the flux density in the vicinity of the stator. One variable is the strength of permanent magnet 110. For more thrust, the strength of magnet 110 should be increased as much as possible and/or as much as is cost effective. In practice, the magnets employed as annular, permanent magnets 110 tend to be extremely powerful permanent magnets. In fact, the permanent, annular magnets tend to be so powerful that the heavy shaft sub-assemblies often need to be handled with great caution. This is because of the tendency for the heavy shaft to be powerfully propelled through space due to the interaction between the powerful magnetic field of its own magnets 110 and any external magnetic field that may be present.

As shown in FIG. 2, another variable that has an influence on the flux density is the size of the effective air gap G. The effective air gap is the distance between pole piece 112 and stator 104. As shown in FIG. 2, the effective air gap G in this example is the sum of the actual air gap 108 and the thickness of sleeve 109. Some effective air gap is needed to prevent the shaft from rubbing against the non load-bearing surfaces of the stator poles. On the other hand, decreasing this air gap, without entirely eliminating it, will advantageously cause the field of magnet 110 to have greater flux density in the vicinity of the stator due to the increased proximity between magnet 110 and the stator. As flux density from magnet 110 in the vicinity of the stator increases, increased interaction of the magnetic fields results in increased force on the shaft, increased attendant actuation of the shaft and increased motor thrust.

Yet another variable affecting magnetic flux density in the vicinity of the stator is the flux density located along the effective air gap. As shown in FIG. 2, there are generally three paths A, B, C for the magnetic field of magnet 110. While magnet paths are generally circuits, it is noted that the magnetic "paths" referred to in this document refer to the portion of the magnetic circuit that lies outside of the magnet itself.

Path A passes through sleeve 109, which is part of the effective air gap. Path B passes through actual air gap 108, which is also part of the effective air gap. Path C passes through the stator. Permanent magnets are generally limited in the maximum amount of magnetic flux that they are capable of outputting. For an annular magnet of finite flux output capability, greater magnetic flux along paths A and B reduces the flux available for path C. As explained above, it is flux density of path C (that is, flux that reaches the vicinity of the stator) that contributes to motor thrust.

Shifting attention to the upper portion of FIG. 2, sleeve 109 is conventionally made from materials that: (1) have a low magnetic permeability; and (2) do not exhibit significant remanent magnetization. The non-magnetic nature of sleeve 109 works to minimize flux along sleeve 109 through path A. Nevertheless, some relatively small amount of magnetic flux is generally "lost" along path A. To represent this lost flux, a solitary dashed flux line is shown passing along and through the sleeve in FIG. 2. Because only a small fraction of the total flux is lost along path A, a higher portion of the total flux generated by magnet 110 will be directed through path C into the vicinity of the stator.

Not too much flux is "lost" at the actual air gap (that is, magnetic path B), either. Because actual air gap 108 is made of air, this potential flux leakage path B has extremely low permeability (the relative permeability of air equals 1.0) and no substantial remanent magnetization. Since the path B leakage flux is small and is primarily a result of sleeve 109, no dashed flux lines are shown along actual air gap 108 at the upper half of FIG. 2.

Because path A leakage flux is increased by the sleeve, one may question why sleeve 109 is present. One important reason for the sleeve is that the sleeve provides a bearing surface to slidably mate with bearing 106 as bearing 106 constrains the linear motion of shaft 102. If no sleeve were present, then the permanent magnets and the intermediate pole pieces of shaft 102 would contact the bearing. Because of the limited choice of materials that can be used to make the permanent magnets, and because of physical discontinuities between magnets and pole pieces, the exposed magnets would not generally provide an acceptable bearing surface. This is due to the friction and wear characteristics that a surface of exposed magnets and pole pieces would have. Therefore, a smooth, long-wearing sleeve is generally necessary at the outer major, bearing surface of a magnetic motor shaft.

Besides providing a relatively smooth and low-friction bearing surface, sleeve 109 also helps provide structural integrity for shaft 102. This can be especially important because the strong permanent magnets 110 can create magnetic attraction toward the stator wall sufficient to deform the entire shaft, absent proper structural support.

Therefore, sleeve 109 is a necessary evil of sorts. Preferably, under the conventional thinking, a material and thickness for the sleeve is selected to: (1) have a low magnetic permeability; (2) avoid magnetic saturation from the magnetic field of the shaft magnets; (3) have a low remanent magnetization value; (4) be easy to shape; (5) be relatively inexpensive; and/or (6) provide good bearing wear. In light of these various objectives, stainless steels are often used for shaft sleeves in magnetic motors. On the negative side, stainless steels are not the easiest materials to work with and do not necessarily provide the lowest rate of bearing wear. On the positive side, stainless steels do perform well relative to other materials that have low magnetic permeability and low residual magnetization. It is recognized that stainless steel is a metal with moderate wear characteristics, so sleeve 109 is constructed to be sufficiently thick to accommodate expected wear.

SUMMARY OF THE INVENTION

In addition to recognized shortcomings of conventional sleeve materials, there are other shortcomings, which may not heretofore have been recognized as shortcomings. By using a thick and relatively impermeable sleeve: (1) the total flux (that is, the sum of path A flux, path B flux and path C flux) is decreased; and (2) the effective path C flux is correspondingly decreased. It should be kept in mind that the path C flux passes through the sleeve in a direction normal to the sleeve's major inner and outer surfaces.

Also, many magnetically impermeable materials are difficult to precisely form or shape. As a result of this, the actual air gap may be increased to accommodate the relatively wide tolerance on the diameter of the shaft caused by imprecision in the thickness of the sleeve. Increasing the actual air gap, to accommodate relatively large sleeve thickness tolerances, will decrease total flux, which in turn decreases the effective path C flux.

The present application deals with these, recognized and unrecognized, problems in the above described prior art by selecting sleeve materials with different levels of magnetic properties (e.g., permeability, remanent magnetization, saturation, anisotropy) than is conventional. Use of these "magnetic" materials will generally result in a bearing surface layer that is more conducive to carrying and maintaining magnetic flux than is conventional. Although this increased sleeve permeability can nearly double the path A leakage flux between adjacent second magnet adjacent poles, the higher permeability also increases the useable flux density through path C. In this way, substantially the same or better motor thrust can be achieved. At the same time, the magnetically permeable sleeve materials can often be selected to provide better wear at the bearing than conventional, relatively impermeable sleeve materials.

Also, the present invention involves methods for fabricating motor pieces (e.g. shafts) that include sleeves made of these different materials. At least some embodiments of the present invention may exhibit one or more of the following objects, advantages and benefits:

(1) magnetic motors with increased thrust;
(2) magnetic motors with better wear characteristics;
(3) magnetic motors with an improved relationship between magnet strength and magnetic thrust;
(4) magnetic motors with decreased thrust losses due to decreased friction;
(5) easier and/or more reliable fabrication of magnetic motors;
(6) longer lasting magnetic motors;
(7) magnetic motors that require less power to be input relative to resulting thrust; and
(8) better structural support in magnetic motor shafts.

According to a first aspect of the present invention, a magnetic motor includes a first motor assembly (e.g., a stator) and a second motor assembly (e.g., a shaft, a rotor). The first motor assembly includes a first bearing surface layer and a first magnet. The first magnet is fixed with respect to the first bearing surface layer. The first magnet is structured to generate a first magnetic field. The second motor assembly includes a second solid bearing surface layer in the form of a sleeve and a second magnet. The second bearing surface layer is located so that at least a portion of the second bearing surface layer is in contact with at least a portion of the first bearing surface layer. The second bearing surface layer includes a material that has relative magnetic permeability of x, wherein x is greater than 2.0. The second magnet is preferably fixed with respect to the second bearing surface layer. The second magnet is structured to generate a second magnetic field. The first and second motor assemblies are structured so that forces caused by the interaction of the first and second magnetic fields will cause the first motor assembly and the second motor assembly to move relative to each other. The first and second bearing surface layers are in moving contact to at least partially guide the relative motion of the first and second motor assemblies.

According to a further aspect of the present invention, a magnetic motor includes a first motor assembly and a second motor assembly. The first motor assembly includes a first bearing surface layer and a first magnet. The first magnet is fixed with respect to the first bearing surface layer. The first magnet is structured to generate a first magnetic field. The second motor assembly includes a second solid bearing surface layer and a second magnet. The second bearing surface layer is located so that at least a portion of the second bearing surface layer is in contact with at least a portion of the first bearing surface layer. The second magnet is fixed with respect to the second bearing surface layer. The second magnet is structured to generate a second magnetic field. The first and second motor assemblies are structured so that forces caused by the interaction of the first and second magnetic fields will cause the first motor assembly and the second motor assembly to move relative to each other. The first and second bearing surface layers are in moving contact to at least partially guide the relative motion of the first and second motor assemblies. The second bearing surface layer has a magnetic permeability, shape and location so that at least a portion of the second bearing surface layer is magnetically saturated by a magnetic field of the second magnet.

According to a further aspect of the present invention, a magnetic motor includes a first motor assembly and a second motor assembly. The first motor assembly includes a first bearing surface layer and a first magnet. The first magnet is fixed with respect to the first bearing surface layer. The first magnet is structured to generate a first magnetic field. The second motor assembly includes a second solid bearing surface layer and a second magnet. The second bearing surface layer is located so that at least a portion of the second bearing surface layer is in contact with at least a portion of the first bearing surface layer. The second bearing surface layer includes a material that has residual magnetization of x, wherein x is greater than 500 Gauss. The second magnet is fixed with respect to the second bearing surface layer the second magnet is structured to generate a second magnetic field. The first and second motor assemblies are structured so that forces caused by the interaction of the first and second magnetic fields will cause the first motor assembly and the second motor assembly to move relative to each other. The first and second bearing surface layers are in moving contact to at least partially guide the relative motion of the first and second motor assemblies.

According to a further aspect of the present invention, a magnetic motor includes a first motor assembly and a second motor assembly. The first motor assembly includes a first bearing surface layer and a first magnet. The first magnet is fixed with respect to the first bearing surface layer. The first magnet is structured to generate a first magnetic field. The second motor assembly includes a second bearing surface layer and a second magnet. The second bearing surface layer is located so that at least a portion of the second bearing surface layer is in contact with at least a portion of the first bearing surface layer. The second bearing surface layer is anisotropic in its magnetic permeability. The second magnet is fixed with respect to the second bearing surface layer. The second magnet is structured to generate a second magnetic field. The first and second motor assemblies are structured so that forces caused by the interaction of the first and second magnetic fields will cause the first motor assembly and the second motor assembly to move relative to each other. The first and second bearing surface layers are in moving contact to at least partially guide the relative motion of the first and second motor assemblies.

According to a further aspect of the present invention, a method of making a magnetic shaft includes several steps. A providing step involves providing a stack comprising a plurality of discrete magnets having an initial stack diameter. Another providing step involves providing a tube having internal space of an initial internal diameter. A gun-drilling step involves gun-drilling the tube so that the initial internal diameter is increased to an as gun-drilled internal diameter. An assembling step, performed after the gun-drilling step, involves assembling the stack and the tube by inserting the stack into the internal space of the tube.

BRIEF DESCRIPTION OF THE DRAWINGS

FIG. 7 is a magnified view of a portion of FIG. 6.

FIG. 8 is a magnified view of a portion of FIG. 7.

FIG. 9 is a graph showing residual magnetization of a shaft sleeve.

DETAILED DESCRIPTION OF THE PREFERRED EMBODIMENTS

Figure 1:
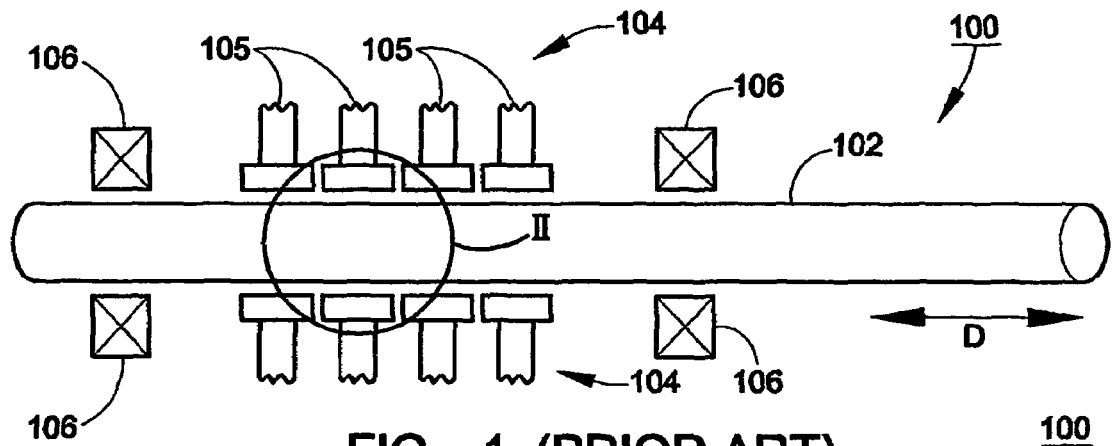
FIG. 1 is side, diagrammatic view of a prior art magnetic linear motor.

Before starting a description of the Figures, instructions for interpreting the words and phrases of this patent document will be provided. More particularly, many jurisdictions allow a patentee to act as its own lexicographer, and thereby allow the patentee to provide instructions in a patent document as to how the words, terms and phrases of the document are to be interpreted as a legal matter. For example, in the United States, the prerogative of the patentee to act as its own lexicographer has been solidly established based on statutory and case law. Accordingly, the following section provides rules for interpreting the words, terns and phrases the claims of this patent document Interpretive Rules Rule 1: There is a "Specially Defined Terms" section set forth below. Only words, terms or phrases that are explicitly defined in the Specially Defined Terms are to be considered to have a special definition, and, of course, the explicit definition provided herein is to serve as the definition for these terms. Accordingly, sources such as the patent specification and extrinsic evidence shall not be used to help define these terms—the explicitly provided definitions shall control.

Rule 2: If a word, term or phrase is not specially defined, then its definition shall be determined in the first instance by resort to dictionaries and technical lexicons that either exist as of the time this patent document is filed. (See definition of "dictionaries and technical lexicons" below in the Specially defined Terms section.) It is acknowledged that dictionaries and technical lexicons often provide alternative definitions. Also, definitions provided in different dictionaries and different lexicons often differ and are not always entirely consistent. In that case, it must be decided which definition is in best accordance with this document. Rules 3 and 4, set forth below, provide some guidelines for choosing between alternative definitions for a word, term or phrase.

Rule 3: The role of the specification (other than the Specially Defined Terms section) as an interpretive or definitional aid shall be limited to helping choose between alternative definitions that meet the requirements of Rule 2 (above).

However, the specification will only be useful when the specification is more consistent with one proposed, pre-existing definition than another.

Rule 4: The role of extrinsic evidence (e.g., expert witnesses) as an interpretive or definitional aid shall be limited to helping choose between alternative definitions that meet the requirements of Rule 2 (above). However, the extrinsic evidence will only be useful when the extrinsic evidence is more consistent with one proposed, preexisting definition than another.

Specially Defined Terms the present invention: means at least some embodiments of the present invention; references to various feature(s) of the "present invention" throughout this document do not mean that all claimed embodiments or methods include the referenced feature(s).

structured to: this phrase is used in the claims to indicate that some thing X is "structured to" perform some objective Y. This means that X must have appropriate structure to meet the objective Y that occurs after the "structured to" language. It does not mean that the possible structures for X are limited to what is shown in the specification, but rather includes any and all X, now conventional or to be developed in the future, wherein the structure of X allows the X to perform objective Y. (Note that X and Y are used as variables in this definition of "structured to;" in the claims, various things may be recited as the X variable for purposes of applying this definition, and various objectives may be recited as the Y variable.)

comprising . . . a; comprising . . . one; comprising . . . x: comprising means including; for example, if a claim recites that an assembly "comprising a" widget, then the claim should be construed to cover assemblies that have one widget or more than one widget; the fact that the assembly includes a widget does not mean that covered assemblies are limited to one widget unless such a limitation is explicitly present in the claim.

dictionaries and/or technical lexicons: any document whose primary purpose is the definition of words, terms and/or phrases; on the other hand, documents that merely discuss, explain or provide examples of devices or methods, without purporting to provide definitions of specific words, phrases or terms, are not to be considered as dictionaries and/or technical lexicons.

bearing surface layer: any bearing surface conventional now, or to be developed in the future, including, but not limited to bearings permitting mutual linear motion of components, bearings permitting mutual linear translational motion of components, bushing geometry bearings, and ball bearing geometry bearings; also, bearing surface layer does not imply that the bearing has a discrete surface layer; for example, a standard ball bearing would have a bearing surface layer (because its balls do have surfaces which can be conceptually viewed as thin surface layers) even if the balls are uniform and do not have any sort of coating sleeve, or other type of discontinuity defining a discrete layer.

first magnet, second magnet: a magnet is any component that generates one or more magnetic dipoles, magnets include, but are not limited to, permanent magnets and electromagnets.

magnetic permeability: the ratio of the magnetic flux density in a material to the magnetizing force producing it, referenced to the value for a vacuum. The permeability referred to is as tested, as applicable, according to: (1) ASTM A 342 "Standard Test Methods for Permeability of Feebly Magnetic Materials;" or (2) ASTM A-772-89, "Test Method for AC Magnetic Permeability of Materials Using Sine Current" as applicable.

magnetic saturation: that degree of magnetization force where a further increase in magnetization force produces no significant increase in the magnetic flux density (permeability) in a specimen.

shaft: includes, but is not limited to, cylindrical shafts, shafts of polygonal cross-section and shafts without a uniform cross-section; it is further noted that a shaft does not need to be cylindrical in order to define a radial direction or a lengthwise direction.

residual magnetization value: the remanent magnetic induction remaining in a material after: (1) the material has been magnetically saturated by an externally-supplied magnetic field, and (2) the externally-supplied field has been reduced to zero subsequent to the magnetic saturation.

high thrust: a linear magnetic motor that can deliver at least 10 pounds of peak thrust per square inch of active shaft surface area.

To the extent that the definitions provided above are consistent with ordinary, plain and accustomed meanings (as generally evidenced, inter alia, by dictionaries and/or technical lexicons), the above definitions shall be considered supplemental in nature. To the extent that the definitions provided above are inconsistent with ordinary, plain and accustomed meanings (as generally evidenced, inter alia, by dictionaries and/or technical lexicons), the above definitions shall control. If the definitions provided above are broader than the ordinary, plain and accustomed meanings in some aspect, then the above definitions will control at least in relation to their broadening aspects.

DESCRIPTION OF PREFERRED EMBODIMENT(S)

I. First Embodiment Magnetic Motor (FIGS. 3 and 4)

Figure 3:
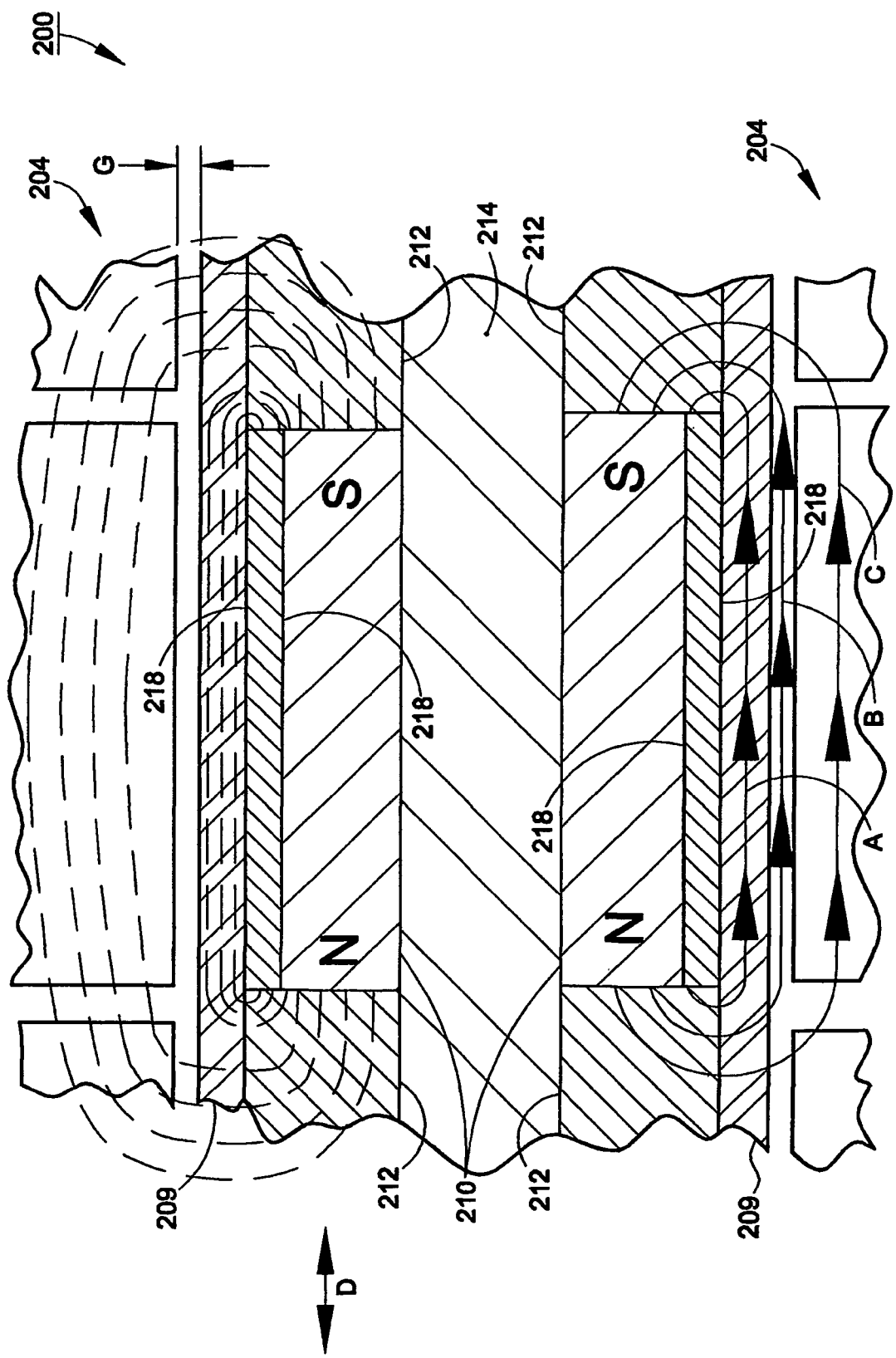
FIG. 3 is a partially cut-away side view of a first embodiment of a magnetic linear motor according to the present invention.
Figure 4:
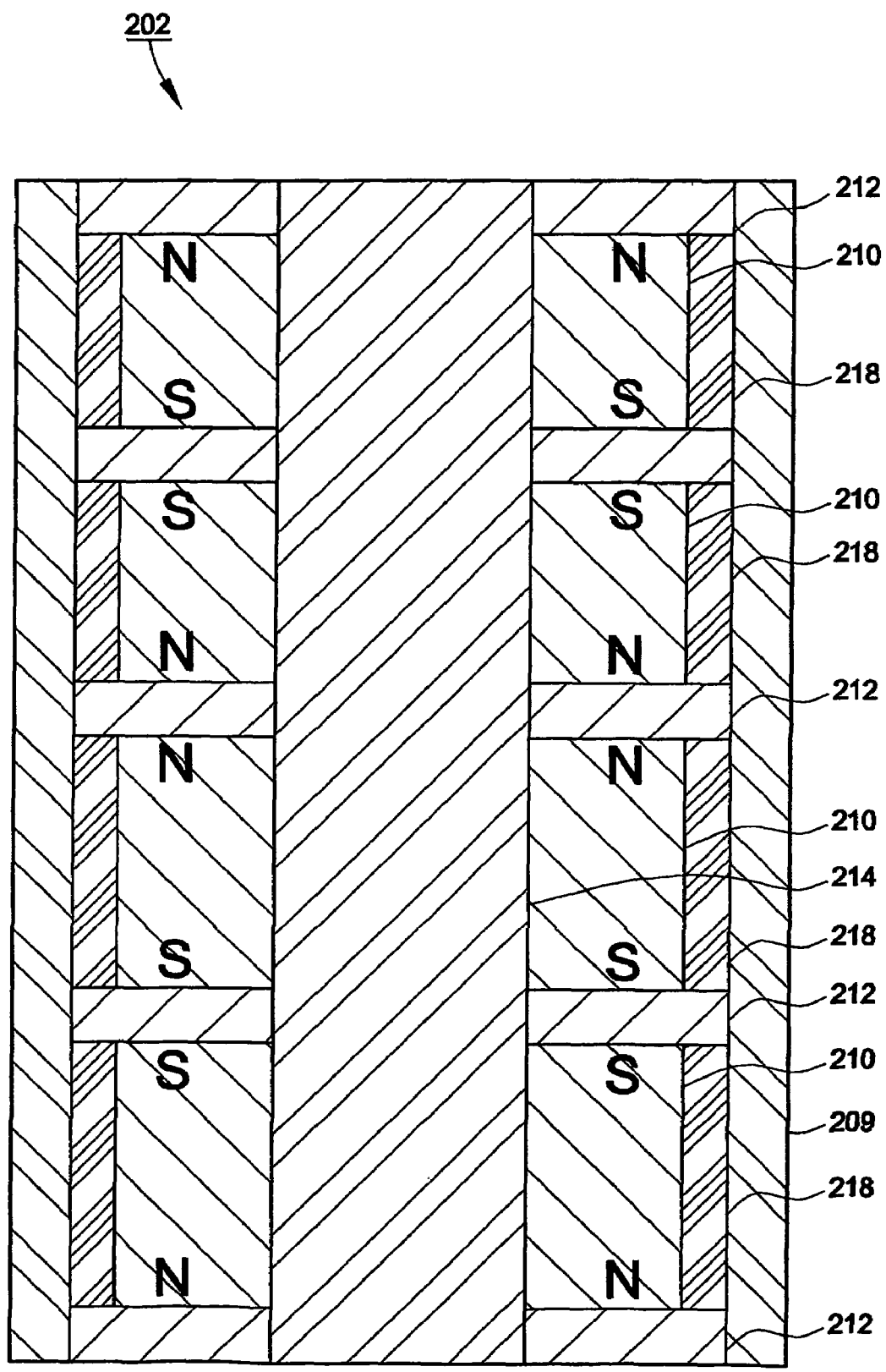
FIG. 4 is a cross-sectional view of the shaft of the FIG. 3 embodiment.

FIGS. 3 and 4 show exemplary magnetic motor 200 according to the present invention. Magnetic motor assembly 200 includes stator 204, sleeve 209, annular permanent magnets 210, pole pieces 212, core 214 and annular spacers 218. Stator 204 is similar to prior art stator 104 and will not be discussed in detail.

Core 214, annular permanent magnets 210, pole pieces 212, annular spacers 218 and shaft sleeve 209 are assembled to form shaft 202, as shown in FIG. 4. Core 214 provides structural support and may be made hollow or solid. Core 214 has a low magnetic permeability (e.g., magnetic permeability of approximately 1.0). In some embodiments of the present invention, the core may be omitted because the stronger and stiffer sleeve materials that can now be used as a shaft sleeve may provide sufficient structural support for the shaft even without a core. If there is no core, the inside of the shaft may be hollow, or, alternatively, the permanent magnets and any pole pieces may be made as disks (instead of as annular shapes).

Permanent magnets 210 are similar to prior art magnets 110 and will not be discussed in detail. Pole pieces 212 (and pole pieces in the stator) serve to make the motor doubly salient by concentrating magnetic flux. In order to focus the flux, pole pieces 212 preferably have a magnetic permeability above 1000. For example, the pole pieces may be made from mild steel, silicon iron BFM, 1018 steel, 4130 steel or low carbon 1008 steel. Preferably the pole pieces are approximately of the same axial length as magnets 210. This way the magnetic profile of the shaft will vary in a smooth, sinusoidal fashion. When shaft 202 has a smooth, sinusoidal profile it is easier to achieve constant thrust as the motor moves under the influence of the controlled, varying magnetic field of the electromagnets of stator 204. This is especially true when stator 204 applies 3-phase AC power to its electromagnets.

Spacers 218 are present so that the outer surface of the shaft will be relatively smooth. More particularly, annular permanent magnets often have relatively large tolerances. If the magnets were nominally dimensioned so that the outer circumferences of the magnets were aligned with the outer circumferences of the pole pieces, then there would be large discontinuities in the outer circumferential surface of the magnet/pole piece stack due to the large magnet tolerances. Annular spacers 218 can be more precisely manufactured and maintain the magnets in reasonable coaxial alignment between the inner circumferential surfaces of the spacers and core 214, as shown in FIG. 4.

Preferably, spacers 218 have a low magnetic permeability of about 1.0. This prevents lost flux through the spacers. Preferably, spacers 218 are made of stainless steel and have a radial thickness larger than 0.02 inches. Preferably, spacers are a little bit longer than the permanent magnets in the axial direction (e.g., by 0.005 inches). As discussed below, spacers are not needed if the permanent magnets with tight tolerances can be used.

Exemplary motor 200 has some important differences from conventional magnetic motors, especially with respect to sleeve 209. Preferably, sleeve 209 is made of hard steel, for example, #4130 carbon steel, hardened to Rockwell "C" 40-50. The hard steel of sleeve 209 is strong, wear resistant and easily shapeable. While the strength, wear resistance and shapeability of hard steel are well known, such a material was previously believed to be unsuitable as a material for magnetic motor sleeving because of its magnetic characteristics.

Because steels and other strong, stiff materials can be used for the shaft sleeve, the shaft sleeve may be made much thinner because it will not wear down much (the wear may be even be negligible). However, the sleeve should be thick enough to provide structural support. If a core is used in the shaft, then much structural support may come from the core and the sleeve may be made very thin. On the other hand, if the core is omitted, then the sleeve must be made thick enough to provide the structural support necessary to maintain the magnets in radial alignment. Also, the steels and other materials that can be used as shaft sleeves under the present invention should preferably be smooth and hard so that there is less friction at the bearings. The shaft sleeve material should be chosen so that it does not corrode under the influence of adjacent materials or the environment of the motor.

However, according to the present invention, the magnetic characteristics typical of hard steel are considered an advantage rather than a disadvantage. To particularly identify some of these magnetic characteristics, sleeve 209: (A) has a relatively large magnetic permeability; (B) has a significant residual magnetization; and (C) magnetically saturates. A discussion of each of these magnetic properties follows.

(A) Magnetic Permeability of Sleeve

According to the present invention, motor sleeves preferably have a magnetic permeability of greater than 2.0, even more preferably have a magnetic permeability greater than 10, and most preferably have a magnetic permeability greater than 100. Hard steel sleeve 209 has a magnetic permeability of over 100. This means that, for a permanent magnet 210 of given strength and coercivity, the density of the magnetic fields will generally increase because of the decreased magnetic reluctance of the sleeve which forms a part of the various magnetic paths.

More particularly, the path A flux density (see FIG. 3) will be large because of the high permeability of the sleeve. This is not advantageous. However, the path C flux density (see FIG. 3) will also increase. This is advantageous because it is the path C flux density that drives the motor. Furthermore, the use of strong, wear-resistant sleeve material allows the sleeve to be made thinner. This thinner sleeve leads to many performance advantages that will be explained in detail below. At this point, suffice it to say that the increased path C flux and the thinner sleeve advantages outweigh the fact that somewhat increased flux is (uselessly) directed along the sleeve though path A.

(B) Residual Magnetization of Sleeve

According to the present invention, motor sleeves preferably have a residual magnetization of greater than 500 Gauss, even more preferably have a residual magnetization between 1000 and 10,000 Gauss. Hard steel sleeve 209 has a residual magnetization between 1000 and 10,000 Gauss. The sleeve will remain reliably and residually magnetized in alignment with the permanent magnets of the shaft.

(C) Magnetic Saturation of Sleeve

Whether sleeve 209 will magnetically saturate under the influence of the magnetic field of magnets 210 will depend upon: (1) the strength of the magnets; (2) the geometry of the shaft (e.g., sleeve thickness); (3) magnetic permeability of the shaft sleeve material; and (4) magnetic saturation properties (e.g., rated saturation flux density, $B_{sat}$) of the shaft sleeve material. Given a typical high thrust magnetic linear motor geometries (e.g., sleeve thickness of 0.015 to 0.02 inches), the shaft sleeve will saturate at magnetic permeabilities of approximately 2.4 or greater. Conventional shaft sleeves do not magnetically saturate. Under the present invention, it is preferable to magnetically saturate the shaft sleeve. If the magnetic field from permanent magnets 210 is strong enough then sleeve 209 will magnetically saturate.

Typically, the shaft sleeve material is not likely to magnetically saturate in the radial direction over that portion of the shaft sleeve that overlies the pole pieces and/or the magnetic poles of the permanent magnets. Because path C passes primarily through this non-saturated zone in the vicinity of the poles, the magnetic reluctance of flux path C will not tend to increase due to magnetic saturation.

However, even though the portion of the sleeve in the vicinity of the pole pieces does not saturate, the portion of the sleeve that lies (with respect to the axial direction) between the magnetic poles of each permanent magnet may become saturated. This is because the path A flux is directed normally to the thin, annular cross-section of sleeve that is available to carry the path A flux. The thin, annular cross section does not require as much flux to saturate because the flux is distributed over such a small cross-sectional area that flux density increases dramatically with additional flux. This is why certain embodiments of the present invention will manifest magnetic saturation in some portions of the sleeve, but not others.

Most preferably, a shaft sleeve material may be selected so that it possesses levels of magnetic permeability µ and magnetic saturation flux density $B_{sat}$ such that it will magnetically saturate in the region between pole pieces, but will not magnetically saturate over the region of the pole pieces. This partial saturation will limit the marginal magnetic permeability along path A and serve to limit the flux lost along path A. While the saturated area may impinge upon some of the path C flux path, some or even most of path C would still cross the non-saturated portion of the sleeve in the vicinity of the pole pieces. The partial saturation may increase the reluctance for path C, but the partial non-saturation prevents the reluctance of path C from increasing too much. In this manner, magnetic saturation characteristics may be selected in such a way as to: (1) advantageously limit the flux lost along flux path A, and (2) not unduly increase the reluctance of path C.

For a fuller appreciation of why the magnetic and wear characteristics of sleeves of the present invention are advantages that overbear the disadvantage of increased lost flux through the sleeve (path A), it is helpful to understand the subtle interplay of the magnetic characteristics and physical motor geometry of magnetic motors of the preset invention. This interplay will now be discussed.

Figure 2:
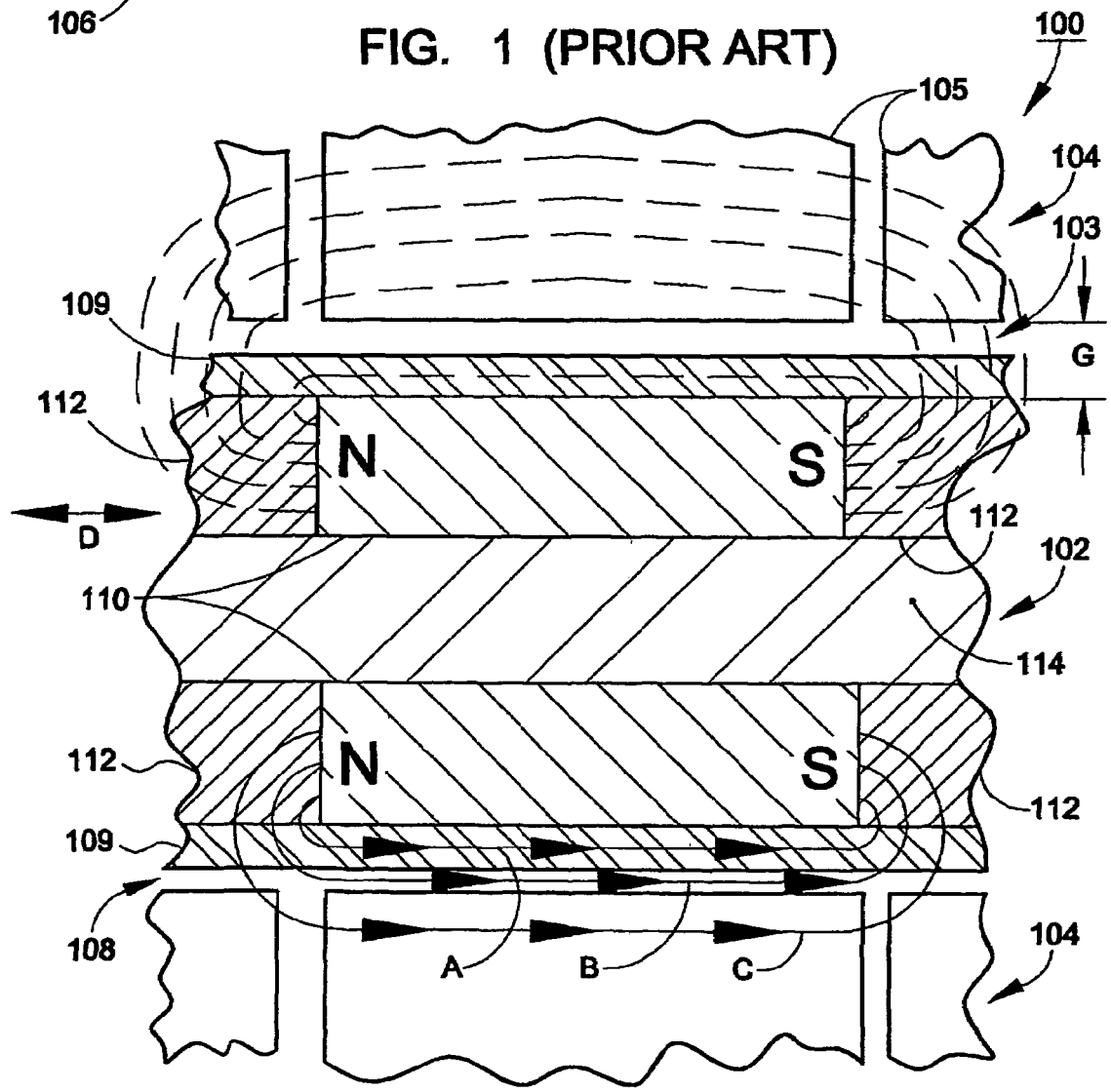
FIG. 2 is a more detailed, and partially cut-away view of the prior art linear magnetic motor of FIG. 1.

By comparing prior art FIG. 2 with FIG. 3, it is observed that the magnetic field of the annular magnet of both prior art magnetic motor 100 and exemplary magnetic motor 200 is primarily directed along three flux paths A, B and C. More particularly, flux path A is the flux that is directed generally parallel to, and within the body of, the respective shaft sleeves 109, 209. Flux path B is directed generally parallel to the respective shaft sleeves, but is located within the respective actual air gaps, located between the respective outer surfaces of the shafts and the respective inner surfaces of the stators. Flux path C represents the flux that reaches the vicinity of the respective stators 104, 204, and flux path C therefore represents the effective flux that helps to actuate and de-actuate the respective motors. On the other hand, the flux of paths A and B do not serve a useful function, and this flux is wasted.

Despite the similarity of the geometry of the three flux paths A, B, C of the respective motors, the total flux and the pattern of flux density is quite different in prior art motor 100 than it is in motor 200. First, the difference in the pattern or distribution of flux density will be explained. Flux path A will have a much, much larger density in motor 209 than in corresponding prior art motor 100. This is because of the high magnetic permeability of sleeve 209. The high permeability of sleeve 209 is very conducive to induced magnetic fields (that is what magnetic permeability is all about), so there is a much higher flux density than if a conventional sleeve, having a magnetic permeability of less than 2, was employed. In other words, path A of motor 200 is a relatively low reluctance path that will draw a relatively high proportion of the total flux put out by the annular magnet.

Viewed in isolation, this high flux density along path A would seem to decrease the thrust of motor 200 because some of that flux would be re-directed up to the vicinity of the stator, thereby contributing to motor thrust, if motor 200 employed the low magnetic permeability sleeves of the prior art. However, as explained below, this apparent disadvantage of a high permeability shaft sleeve is overborne by advantages, when motor 200 is considered as a whole.

Moving now to flux path B, there is not a great flux density over path B in either motor 100 or motor 200. In each case, the air gap is fairly small, and, of course, the air has a small permeability and therefore has flux path B represents a high reluctance path under both conventional magnetic motors and those according to the present invention. However, there are two differences between the air gap in motor 100 and motor 200: (1) actual air gap difference; and (2) effective air gap difference. Together and/or separately, these two differences have a considerable effect on motor performance. More particularly, because of the novel shaft sleeve materials that are now contemplated by the present invention: (1) the actual air gap in motor 200 may be made smaller than the corresponding actual air gap in motor 100; and (2) the effective air gap in motor 200 may be made smaller than the corresponding effective air gap in motor 100.

The reason that the effective air gap may be made smaller in motor 200 will now be explained. In motor 100, the permeability of the shaft sleeve is relatively small (generally the conventional sleeve permeability is approximately 1.0, which is the value of air or a vacuum). This low, conventional permeability of motor 100 significantly adds to the magnetic reluctance of flux path C. In fact, because the conventional low permeability sleeve of motor 100 has a reluctance that is approximately the same as that of equal distance of air, the sleeve can be considered as part of the air gap for the purpose of determining the magnetic reluctance of flux path C. Thus in motor 100 the effective air gap equals the actual air gap plus the shaft sleeve thickness.

In motor 200, the effective air gap will tend to be much smaller. This is because motor 200 has a high magnetic permeability shaft sleeve. In embodiments of motor 200 where the magnetic permeability of the shaft sleeve is extremely high, the sleeve may not significantly add to the magnetic reluctance of path C at all. In this embodiment, the effective air gap would be very close to equal to the actual air gap. Therefore, these embodiments of motor 200 would have a much smaller effective air gap than comparable embodiments of motor 100.

In embodiments of motor 200 where magnetic permeability of the shaft sleeve is larger-than-conventional, but not extremely large, the effective air gap will still tend to be smaller than in comparable conventional motors 100. For example, if the shaft sleeve of motor 200 were constructed to have a magnetic permeability of 2.4, then the reluctance of the shaft sleeve would contribute, in a non-negligible fashion, to the effective air gap. More specifically, the amount of effective air gap attributable to the 2.4-permeability shaft sleeve would be equal to the thickness of the shaft sleeve divided by its permeability (2.4). In other words, the amount of the effective air gap attributable to the shaft sleeve is inversely proportional to the shaft sleeve relative permeability in the direction of flux path C. As a further example, a ferromagnetic shaft sleeve with a typical high permeability of 1000 would add an effective air gap of $1/1000$ of an inch for every inch of sleeve thickness.

Even in embodiments of motor 200 where the contribution of the shaft sleeve to the effective air gap is not negligible, it should be borne in mind that the relationship between effective air gap and magnetic reluctance of path C is an inverse linear relationship—a relatively small decrease in the effective air gap will result in a large decrease in the magnetic reluctance of flux path C, and a disproportionate and advantageous increase in motor thrust, especially in doubly salient motors with a small effective air gap.

Moving now to the actual air gap difference which may be realized as a result of the shaft sleeve materials of the present invention, one reason for the smaller actual air gap in motor 200 is that the shaft of motor 200 can usually be constructed to a tighter tolerance. In both the prior art motor 100 and motor 200, it is recognized that the air gap should be made as small as possible, with the restriction that the shaft preferably should not touch the stator anywhere along its length. This is because such contact may damage the stator and/or shaft through excessive friction. However, if the stator is a bearing-lined stator such that the interior surfaces of the stator are designed to support and guide the shaft, then shaft can and should touch the stator lining.

Therefore, it is the tolerances on the size (for example, tolerance on shaft diameter) and the shape (for example, tolerance central axis) that effectively determine how small the air gap can indeed be. However, tolerances on the shaft (especially the axial integrity) tend to be driven up by the fact that the powerful, multiple-dipole magnetic fields generated by the powerful annular magnets within the shaft tend to bend the shaft a bit and otherwise deform the shaft in difficult-to-predict ways.

Because the shaft of motor 200 can usually be constructed to tighter tolerances, the actual air gap will usually be smaller in motor 200. There are a couple of reasons that the shaft sleeve materials of the present invention will generally lead to the advantageous tighter tolerances. one reason is that shaft sleeve 209 in motor 200 can be (and preferably is) made of a high magnetic permeability material. Instead of being constrained to the limited palette of low magnetic permeability metals, ceramics and plastics, the motor designer is now allowed to use attractive and heretofore shunned materials, such as hard steel, for the shaft sleeve. These materials will be more shapeable to begin with, and, perhaps more importantly, their high strength per unit volume can prevent the magnets from deforming the shaft. This is not to say that all highly magnetically permeable materials have a high strength, but merely that it may be much easier to choose an acceptable, high-strength material when one is not limited to magnetically impermeable metals. The additional workability and structural strength that is made possible by the shaft sleeve materials of the present invention will often lead directly to tighter shaft tolerancing (and a smaller effective air gap).

Another reason for the small actual air gap is that the shaft sleeve 209 may also be made to be relatively thick. The prevailing belief in the area of magnetic motor shaft design is that the shaft sleeve must be made as thin as possible so that the effective air gap is small. However, when using a highly magnetically permeable material, the shaft pole faces are effectively extended by the thickness of the shaft sleeve. The present invention makes it feasible to design thicker shaft sleeves. These thicker shaft sleeves will increase the structural integrity of the shaft, which in turn will decrease critical shaft tolerances. This is an additional reason that the actual air gap will be decreased in the present invention (without fear that the shaft will ever touch the stator).

On the other hand, some designers may choose to make magnetically permeable shaft sleeves of the present invention as thin sleeves. Basically, shaft tolerance and flux loss needs to be balanced on a motor design by motor design basis, depending upon the required thrust, tolerances, bearing life and desired shaft sleeve material.

A smaller actual air gap results in increased effective (path C) magnetic flux and a consequent increase in motor thrust. One benefit of a smaller actual air gapis that less flux is lost along path B, along the length of the air gap. A much more important advantage of a small air gap is the fact that a small actual and/or effective air gap drastically increases total flux. The reason that a small air gap leads to greater total flux, and the advantage of greater total flux will be discussed below in connection with the discussion of total flux of motor 200.

Moving now to the path C component in the pattern of flux density of motor 200, path C is the flux that is present in the vicinity of the stator, radially outward of the actual air gap. As mentioned above the flux of path C is the portion of the magnetic field that interacts with the magnetic fields of the stator to make the shaft and stator move (and stop moving) relative to each other. The greater the flux density along path C, the greater the thrust of the motor. In motor 200, the flux density along path C is much greater than for comparable prior art motor 100. This is because the total flux from high energy annular magnet 210 is much greater than the total flux put out by comparable, high energy magnet 110.

This brings the discussion back to the issue of total flux. The flux that a given magnet (annular or otherwise) will put out is a function of the reluctance of the various paths in the vicinity of the magnet. If all of the paths are high reluctance, or low permeability, paths (e.g., a magnet suspended in a vacuum), then the flux will be relatively low. On the other hand, as the reluctance of some or all of the available paths is decreased, the same magnet will put out much more flux, and this increased flux will primarily be located along the low reluctance paths.

Applying these guidelines for magnetic flux to the present situation, path C of motor 200 has a much, much lower reluctance than the comparable path C of motor 100. For this reason, magnet 210 will output a lot more flux than magnet 110, and this increased flux will be primarily disposed along path C, thereby greatly increasing the thrust of the motor. The reason that path C of motor 200 is a low reluctance path is a result of employing a different type of material to construct shaft sleeve 209. As mentioned above, the present invention contemplates the use of high strength, shapeable, magnetically permeable materials to construct shaft sleeve 209. The use of these types of materials causes the reluctance of path C to decrease for two reasons: (1) the air gap can be made smaller, and (2) the sleeve has a high magnetic permeability. Each of these reasons will now be discussed in order.

As mentioned above, the shaft sleeve materials that can be used under the present invention allow tighter tolerancing for the shaft, which in turn allows a smaller air gap. By reviewing path C for motor 200 (see FIG. 3), path C runs through the following segments (1) pole piece 212; (2) shaft sleeve 209; (3) air gap G; and (4) stator 204. The reluctance for path C is equal to the sum of the reluctances associated with each of these four segments of path C identified above. The reluctance of the pole piece (portion (1)) and the stator (portion (4)) is the same for both motor 200 and comparable prior art motor 100, so the reluctance of these portions will not be discussed in detail. The reluctance of the shaft sleeve (portion (2)) will be discussed below.

Focusing on the reluctance of the air gap portion, the air gap has a very large reluctance which is positively correlated with its size. In other words, decreasing the air gap decreases reluctance. Also, the decrease of reluctance with gap size is not a linearcorrelation. Rather, small decreases in the air gap effect a tremendous, disproportionate decrease in reluctance for this part of path C. Therefore, even the small decrease in gap size permitted by the tighter tolerancing can greatly decrease path C reluctance, increase path C flux, and thereby greatly increase the motor thrust. Perhaps surprisingly, the small decrease in air gap permitted under the present invention will tend to more-than-offset the useful flux lost through path B (and the corresponding thrust lost) due to the permeable shaft sleeve.

Moving to the portion of path C that runs through the shaft sleeve (in a generally perpendicular direction (see FIG. 3)), the reluctance of this portion of the path is decreased because of the higher permeability materials that are used to construct the shaft sleeve under the present invention. In a conventional motor, such as motor 100, the impermeable shaft sleeve contributes to the path C reluctance. That is true only to a much smaller degree under the present invention.

In conventional motors, the sleeve was kept as thin as possible in order to maximize the path C flux. After all, the shorter the length of path C that passed through impermeable zones, the less the reluctance and the greater the motor thrust. On the other hand, the sleeve had to be thick enough to prevent shaft deformations and allow reasonably tight tolerancing on the shaft.

Under the present invention, the designer is presented with a couple of new options. First, the permeable sleeve 209 of the present invention may be made thin. This may be especially feasible because of the higher strengths of some the high permeability shaft sleeve materials (e.g., hard steel) that are available for use under the present invention. These thin sleeves would be advantageous in that they result in less flux being lost along path A and that they would contribute extremely little to the reluctance of path C. On the other hand, a thin sleeve may mean that the tolerances on the shaft will remain relatively high, which is a negative for the reasons discussed above.

Instead of opting for a thin, permeable sleeve, some designers may make the sleeve considerably thicker than was feasible in conventional magnetic motors with impermeable shaft sleeves. These thick sleeves still may not contribute to the reluctance of path C very much, especially at very high permeability values. For example, a prior sleeve that has a permeability of 1.0 and a thickness of 0.5 millimeters would have about the same reluctance as a permeable sleeve with a permeability of 2.0 and a thickness of 1.0 millimeter. Designers are free to make the sleeves considerably thicker, while still decreasing the reluctance of path C relative to the non-permeable sleeve, prior art magnetic motors.

In deciding on thickness of sleeves when designing motors according to the present invention, the motivations to make the sleeve thinner (e.g., low reluctance) and the motivations to make the sleeve thicker (e.g. tighter tolerances, smaller air gap) will still need to be balanced against each other, and optimized depending upon the totality of the circumstances. However, the various balances that can be achieved under the present invention will generally be more favorable than the balances that can be achieved with prior art non-permeable shaft sleeves.

Before leaving this discussion of the portion of flux path C that passes through the sleeve, it is noted that the sleeve may also be made to be anisotropic in its magnetic permeability (the inverse of reluctance). More particularly, anisotropic materials possess different permeability values depending upon the relative orientation of the material and the applied magnetic field. While many anisotropic materials may have drawbacks in that they may be expensive or difficult to work with, to the extent that anisotropic materials are practical, such materials could greatly improve the thrust performance of motors of the present invention.

For example, the material of the shaft sleeve may be oriented so that it has high permeability in the radial direction (direction outward from the centerline of the shaft) and low permeability in the axial direction (direction along the shaft). In this example, the reluctance of flux path C will be decreased by the radial component of the permeability. At the same time, the reluctance of path A (a lost flux path) will be decreased due to the low permeability in the axial direction of the sleeve.

Figure 5:
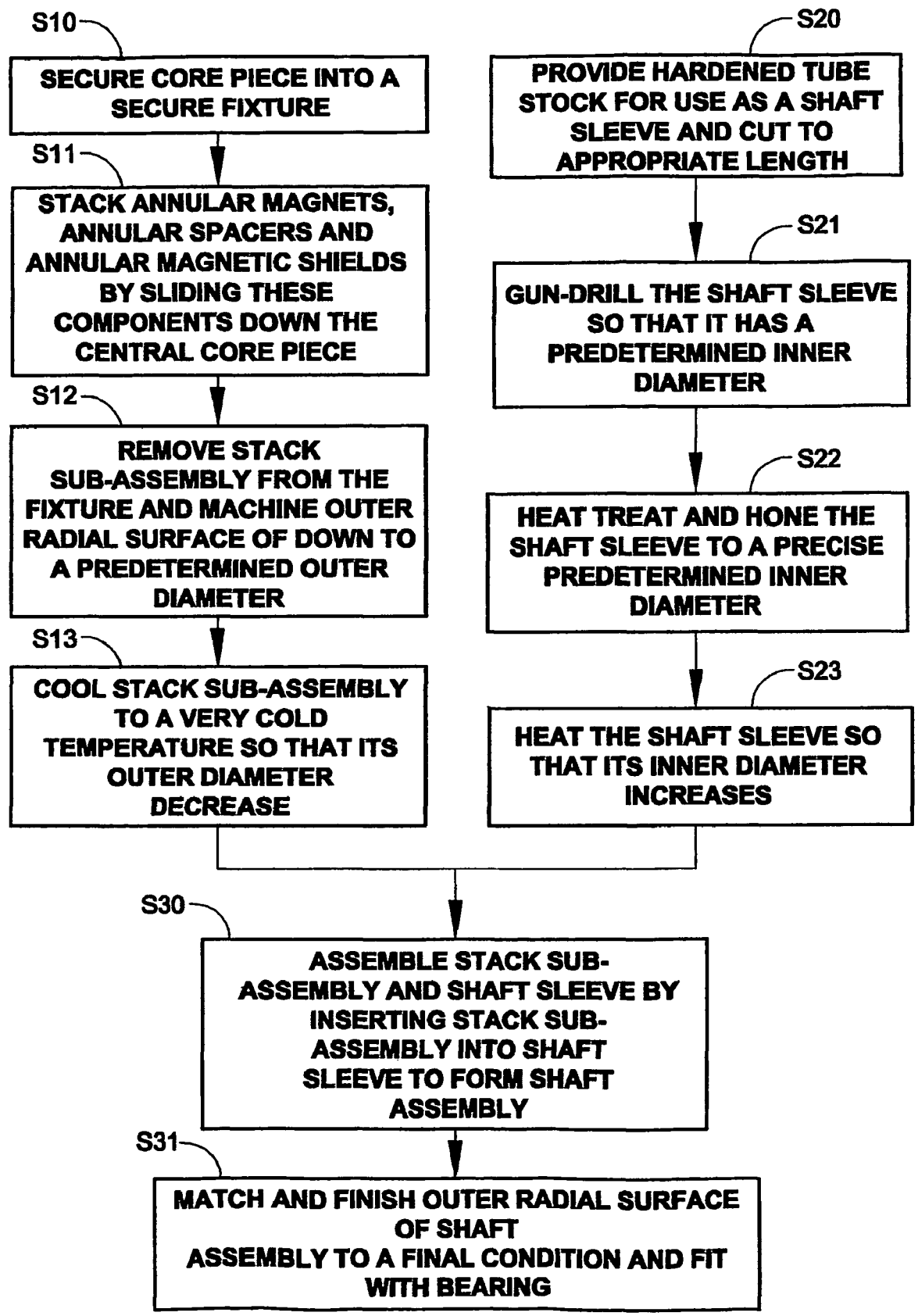
FIG. 5 is a flowchart of a magnetic motor shaft assembly method according to the present invention.

II. Method of Assembling a Magnetic Motor (FIG. 5)

FIG. 4 is a flowchart for a method of assembling a shaft according to the present invention. At step S10, the core piece (preferably tubular or solid) is bolted into an appropriate fixture. Because of the powerful, high energy magnets that are to be stacked around the core piece, the fixture must be very secure. For example, the core piece may be locked into a stainless steel nut.

At step S11 annular magnets, pole pieces and annular spacers are stacked around the core piece to make a stack sub-assembly. More particularly, magnets and pole pieces are stacked directly around the core in alternating fashion. The annular spacers are placed around the outside of the annular magnets either before or immediately after each magnet is set down around the core. The magnets are preferably oriented so that the poles of consecutive magnets are oriented in opposite directions on an alternating basis (as is conventional).

Preferably, (unset) epoxy is disposed between the adjacent ends of the annular magnets and pole pieces. Preferably, this is accomplished by bathing the magnets and/or pole pieces in epoxy immediately prior to stacking them around the core. Because the pole pieces are tightly toleranced to fit closely around the core piece, the annular magnets will be coaxially centered precisely about the core piece. The epoxy helps keep the magnets, which are not as tightly toleranced, coaxially centered. As an alternative, pairs made of one annular magnet and one core piece may be epoxied prior to insertion of the core piece. If epoxy is used, then the epoxy should be allowed to set after the stack subassembly is completed. Also, a top nut may be used to clamp the stack in the axial direction while the stack is setting.

At step S12, the stack sub-assembly is removed from the fixture and the outer radial surface of the stack is machined down so that the stack subassembly has a predetermined outer diameter. After machining, in order to prepare the stack sub-assembly for assembly with the shaft sleeve, the stack sub-assembly is cooled to a cold temperature (e.g., 0 degrees Fahrenheit) so that the outer diameter of the stack sub-assembly decreases due to the thermal treatment.

In parallel with the preparation of the stack sub-assembly, the shaft sleeve is also prepared for the ultimate assembly of the shaft. At step S20, hardened tube stock is provided for the shaft sleeve and cut to appropriate length. At step S21, the shaft sleeve is gun-drilled to a fairly precise inner diameter. At step S22, the shaft sleeve is heat-treated and honed so that the inner diameter is very precise. At this juncture, the inner diameter of the shaft sleeve should be equal to or slightly less than the outer diameter of the stack sub-assembly. At this juncture, the shaft sleeve and the (not yet cooled) stack sub-assembly would have a very close fit—so close that they could not be assembled.

At step S23, the shaft sleeve is heated (e.g., to 275 degrees Fahrenheit) so that the shaft sleeve and its inner diameter expand. When the stack sub-assembly is cooled and the shaft sleeve is heated, then stack subassembly is inserted (at step 30) into the inner diameter of the shaft sleeve because of the respective thermal contraction and expansion.

The thermal treatment allows the stack assembly to be inserted in the shaft sleeve. As an alternative method, only the stack assembly may be thermally treated (that is, cooled), or only the shaft sleeve may be thermally treated (that is, heated). However, the thermal treatments must effect sufficient, temporary geometrical adjustment so that the stack assembly will fit within the shaft sleeve. Of course, after the thermal treatment is over, the shaft sleeve and stack assembly will shrink and expand back toward their respective pre-thermal treatment sizes, which will result in an extremely tight interference fit.

It is noted that other ways exist, besides thermal treatment, to temporarily adjust the relative sizes of the stack assembly and/or the shaft sleeve to allow assembly. For example, the inner axial cavity of the shaft sleeve may be pressurized to expand the inner diameter. After the stack assembly is inserted into the shaft sleeve, the pressure would be released to allow the shaft sleeve to contract back down to a very tight fit.

At step S31, the outer radial surface of the shaft assembly is matched and finished to a final condition (preferably by a grinder or lathe) and fitted to the bearing to make a linear motor. This assembly process is preferred for the magnetic sleeve embodiments of the present invention, but this inventive process may also be used for assembling more conventional shafts. The gun-drilling allows a precise, relatively long and axially aligned bore to be made. This is important so that the sleeve fits tightly over the stack to provide precise alignment of internal components and enhanced structural integrity.

III. Second Embodiment of a Magnetic Motor (FIGS. 6 to 9)

Figure 6:
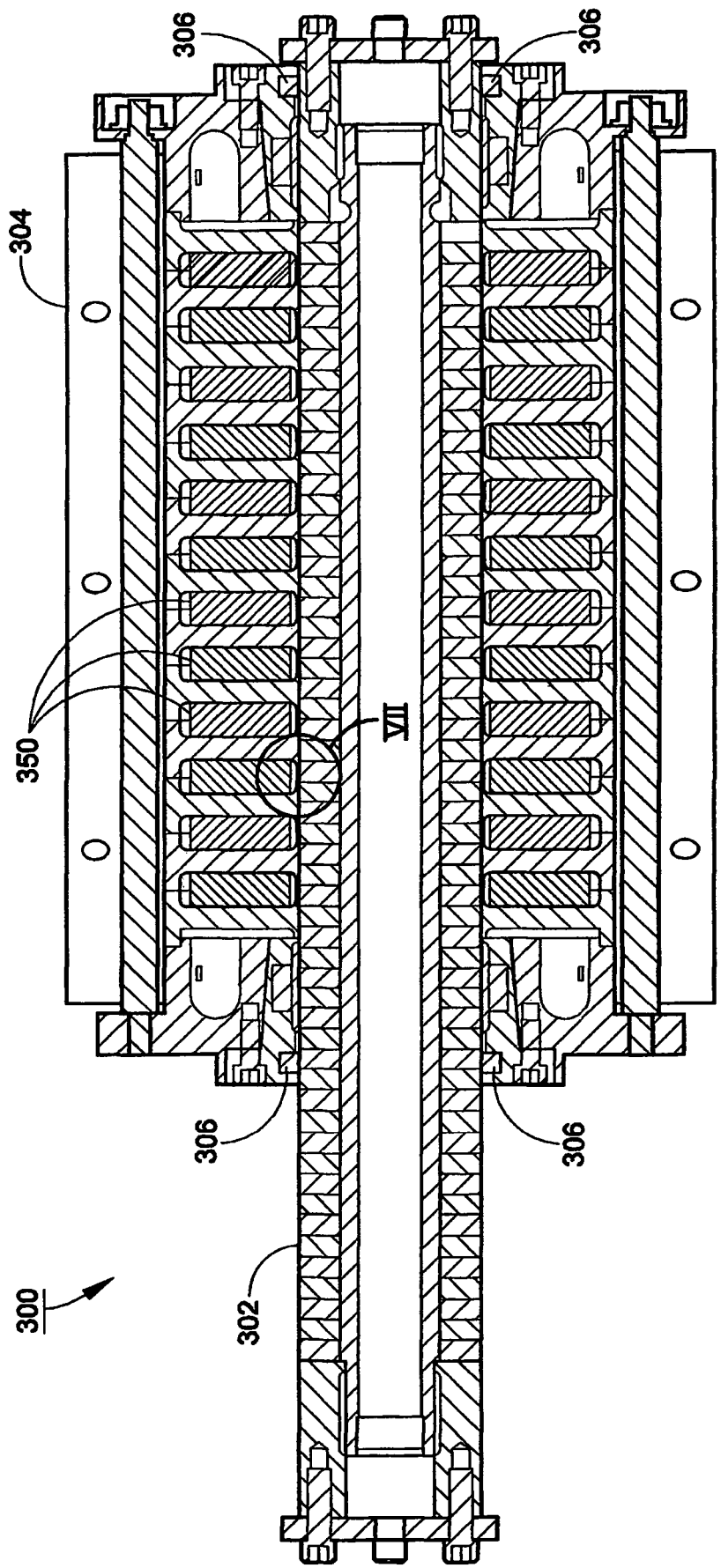
FIG. 6 is a cross-sectional view of a second embodiment of a magnetic linear motor according to the present invention.

As shown in FIGS. 6 to 8, motor 300 includes stator 304 and shaft 302. Shaft 302 is driven to move in a linear direction under the guidance of bearings 306. As shown in FIG. 7, shaft 302 includes shaft sleeve 309, alternating magnets 310 and pole pieces 312. Sleeve 309, is made of hard steel so that it has large magnetic permeability and residual magnetization and exhibits magnetic saturation. Because of the magnetic characteristics of shaft sleeve 309, it does not contribute to the effective air gap G. Rather, as shown in FIGS. 7 and 8, the effective air gap G corresponds to the tiny actual air gap between the outer circumferential surface of shaft 302 and the inner circumferential surface of stator 304.

Similar to motor 200, motor 300 has flux paths A (lost flux), B (lost flux) and C (effective flux). Similar to motor 200, the path A flux is relatively large, but is more than made up for by the decreased magnetic reluctance of path C resulting from the smaller effective air gap G.

A simplified analytical representation shows how the highly permeable shaft sleeve 309 improves motor performance. Specifically, motor thrust as a function of the various reluctance paths of the motor is given by the following roughly accurate equation (1):

$$F = K_1/(1_s/\mu_s + 1_g/\mu_0 + R_m) - K_2 \times (\mu_s \times 1_s) \quad (1)$$

In this equation, F is the motor thrust, $K_1$ is a constant of proportionality for thrust due to path C magnetic flux, $K_2$ is a constant of proportionality for thrust lost due to lost magnetic flux, 1s is the shaft sleeve thickness, $\mu_s$ is the shaft sleeve permeability, $1_g$ is the air gap length, $u_0$ is the permeability of air (approximately 1.0) and $R_m$ is the magnet effective reluctance. For most practical motor geometries, $K_2$ is small relative to $K_1$. When $K_2$ is small, as the equation shows, us can be made relatively large. This increases thrust due to the $K_1$ term. Not much force is lost because the $K_2$ term is small.

FIG. 9 shows a graph representing the residual magnetization in the radial direction of shaft sleeve 309. In the graph, the H axis represents the net magnetic field that to which the shaft sleeve is exposed. This field will be the net field of the permanent magnet and the opposing (but variable) magnetic field of the electromagnets of the stator. The B axis represents the magnetization of the shaft sleeve.

As shaft sleeve 309 is first applied to shaft 302, the net magnetic field increases from 0 to a high value as shown by curve 402. At the saturation point $H_0$ of shaft sleeve 309, the magnetization will stop increasing even as the applied magnetic field H increases. As stator 304 applies oppositely directed magnetic fields, the net magnetic field is subject to decrease, as shown by curve 404. If the net field H falls below the saturation point $H_0$, then the magnetization of shaft sleeve 309 may decrease slightly. However, even if the net magnetic field H falls to 0, shaft sleeve 309 will still be magnetized with its residual magnetization $B_{fi}$ as shown in FIG. 9. If the net magnetization H were to fall below 0, then the magnetization of shaft sleeve 309 would fall according to curve 406, but this would seldom, if ever, happen in a magnetic motor because the stator magnets (negative H contribution) are not that powerful compared to the permanent magnets (positive H contribution).

As shown in FIG. 8, shaft 302 does not include annular spacer pieces between magnet 310 and shaft sleeve 309. This is because more precisely dimensioned permanent magnets are used in shaft 302. However, both magnets 310 and pole pieces are bathed in 2 part thermal setting epoxy resin as they are being assembled onto the core. When the shaft is baked to set the epoxy a thin (e.g., 0.001 to 0.002 inches) layer of epoxy (not shown) surrounds magnet 310, including the outer circumferential surface of magnet 310 between the magnet and shaft sleeve 309. The epoxy surrounding the magnet and the pole pieces prevents air from being trapped under shaft sleeve 309. The epoxy layer effectively smoothes discontinuities in the outer circumferential surface of the magnet/pole piece stack to prevent bubbles and bumps in the shaft sleeve. It is important to have a smooth shaft sleeve to ensure even wear at the bearings and to prevent mechanical interference with the stator.

As shown in FIGS. 7 and 8, stator 304 includes stator coil 350, dust seal 352 and stator liner 354. Coil 354 is one of the electromagnets, whose magnetic fields drive shaft 302 in linear motion. Dust seal 352 serves to protect coil 354 from dust. Stator liner 354 is preferably made of stainless steel and also serves to protect the stator. Stator liner 354 is extremely thin so that it does not add significantly to the effective air gap.

IV. Third Embodiment of a Magnetic Motor (FIG. 10)

Figure 10:
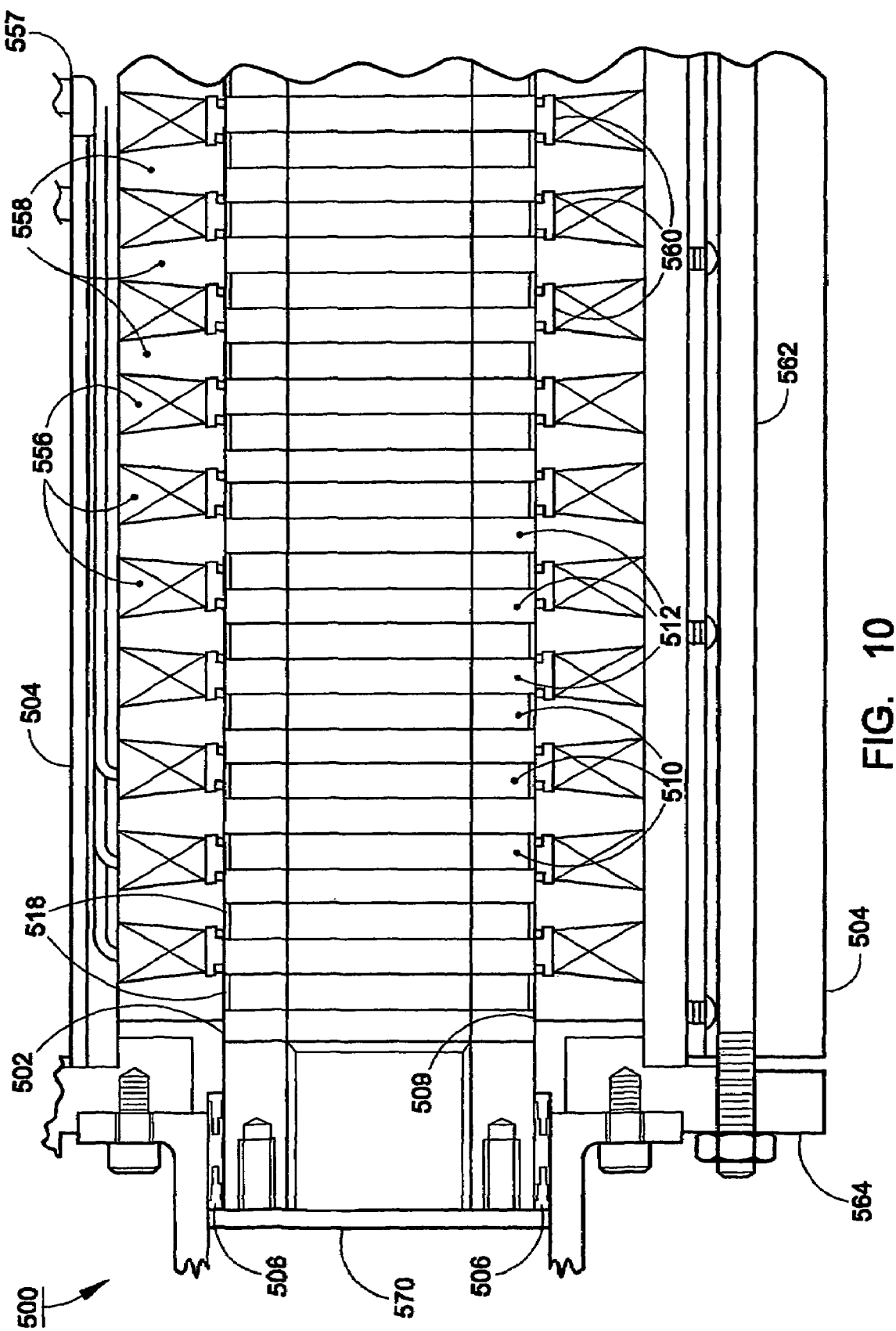
FIG. 10 is a cross-sectional view of a third embodiment of a magnetic linear motor according to the present invention (cross-hatching has been omitted from the cross-sectional view of FIG. 10 for the sake of clarity).

FIG. 10 shows another preferred embodiment of a linear magnetic motor 500. Motor 500 includes stator 504, shaft 502 and bearing 506. Bearing 506 is preferably a bronze bushing.

Shaft 502 includes magnets 510, pole pieces 512, annular spacers 518, shaft sleeve 509 and nut assembly 570. Magnets 510, pole pieces 512, annular spacers 518 and shaft sleeve are similar to their respectively corresponding components in previously-discussed motor 200. In this embodiment, the axial length of two magnets 510 and two pole pieces ("the pole pair pitch") is preferably 0.922 inches. The nut assembly 570 is structured to accommodate a cap (not shown) by a threaded connection.

Stator 504 includes coils 556, power supply lines 557, pole pieces 558, spacer rings 560, tensioning rod 562 and collar assembly 564. Coils 556 are preferably 115 turn, 19 gauge copper wire. Power supply lines preferably selectively provide 3 phase AC power to the coils to control movement of shaft 502 relative to the stator. Pole pieces 558 serve to concentrate and direct the magnetic field of coils 556 by forming a low reluctance path. Accordingly, pole pieces 558 are preferably made of a material with a high magnetic permeability. Tensioning rod 562 holds the stator stack together through a threaded engagement, as shown in FIG. 10. Collar assembly 564 is a housing for stator 504.

V. Conclusion

U.S. Pat. No. 5,691,582, issued on Nov. 25, 1997 to Lucas, et al. (hereby incorporated by reference), discloses a doubly salient linear magnetic motor having an especially preferred construction due to its use of high energy magnets and the highly favorable layout of its flux paths. Modifying this prior art design so that its shaft sleeve is made of a magnetically permeable, low friction, long wearing material (e.g., hard steel) yields an especially preferred embodiment of the present invention.

The description and examples set forth in this specification and associated drawings set forth preferred embodiment(s) of the present invention. The specification and drawings are not intended to limit the exclusionary scope of this patent document. Many designs other than the above-described embodiments will fall within the literal and/or legal scope of the following claims. Because it is generally impossible for a patent to describe in its specification every conceivable and possible future embodiment of the invention, the exclusionary scope of this patent document should not be limited by features: (1) reflected in the specification and/or drawings, but (2) not explicated or reasonably implicated by the language of the following claims.

What is claimed is:

1. A magnetic motor comprising;
a first motor assembly comprising: a first bearing surface layer, and a first magnet, fixed with respect to the first bearing surface layer, structured to generate a first magnetic field; and a second motor assembly comprising: a second magnet, and a second solid bearing surface layer in the form of a sleeve, located so that at least a portion of the second bearing surface layer is in contact with at least a portion of the first bearing surface layer, with the second bearing surface layer comprising a material that has relative magnetic permeability of x, wherein x is greater than 2.0; said assembly structured to generate a second magnetic field defined by at least said second magnet and said second bearing surface layer, with the first and second motor assemblies being structured so that forces caused by the interaction of the first and second magnetic fields will cause the first motor assembly and the second motor assembly to move relative to each other, and with the first and second bearing surface layers being in moving contact to at least partially guide the relative motion of the first and second motor assemblies.

2. The motor of claim 1 wherein the magnetic motor is a high thrust magnetic motor.

3. The motor of claim 1 wherein x is greater than 100.

4. The motor of claim 1 wherein: the first motor assembly is a stator; the first bearing surface layer comprises a bushing; the first magnet is an electromagnet, such that the first magnetic field can be selectively controlled; the second motor assembly comprises a shaft; the second bearing surface layer is located over at least a portion of the shaft; and the second magnet located within the shaft and comprises at least one permanent magnet.

5. The motor of claim 4 wherein the motor is a doubly salient motor.

6. The motor of claim 4 wherein the shaft comprises: a plurality of annular, pennanent magnets; a plurality of pole pieces, with the magnets and the pole pieces being assembled in an alternating manner; and a sleeve disposed at least partially around the alternating magnets and pole pieces, with the sleeve comprising an outer major surface, and with the second bearing surface layer being located at least partially along the outer major surface of the sleeve.

7. The motor of claim 1 wherein the second bearing surface layer comprises hard steel.

8. The magnetic motor of claim 1, wherein the material of the second bearing surface layer has a residual magnetization value of y that is greater than 500 Gauss.

9. The motor of claim 8 wherein y is greater than 1000 Gauss.

10. The motor of claim 8 wherein: the first motor assembly is a stator; the first bearing surface layer comprises a bushing; the first magnet is an electromagnet, such that the first magnetic field can be selectively controlled; the second motor assembly comprises a shaft;
the second bearing surface layer is located over at least a portion of the shaft; and the second magnet located within the shaft and comprises at least one permanent magnet.

11. The motor of claim 10 wherein the motor is a doubly salient motor.

12. The motor of claim 10 wherein the shaft comprises: a plurality of annular, permanent magnets; a plurality of pole pieces, with the magnets of the pole pieces being assembled in an alternating manner; and a sleeve disposed at least partially around the alternating magnets and pole pieces, with the sleeve comprising an outer major surface, and with the second bearing surface layer being located at least partially along the outer major surface of the sleeve.

13. A magnetic motor comprising: a first motor assembly comprising; a first bearing surface layer, and a first magnet, fixed with respect to the first bearing surface layer, structured to generate a first magnetic field; and a second motor assembly comprising: a second solid bearing surface layer, located so that at least a portion of the second bearing surface layer is in contact with at least a portion of the first bearing surface layer, and a second magnet, fixed with respect to the second bearing surface layer, structured to generate a second magnetic field, with the first and second motor assemblies being structured so that forces caused by the interaction of the first and second magnetic fields will cause the first motor assembly and the second motor assembly to move relative to each other, and with the first and second bearing surface layers being in moving contact to at least partially guide the relative motion of the first and second motor assemblies; wherein the second bearing surface layer has a magnetic permeability, saturation characteristic, shape and location so that at least a portion of the second bearing surface layer is magnetically saturated by a magnetic field of the second magnet.

14. The motor of claim 13 wherein the second bearing surface layer comprises: a saturated portion that is magnetically saturated by the magnetic field of the second magnet; and an unsaturated portion that is not magnetically saturated by the magnetic field of the second magnet.

15. The motor of claim 14 wherein: the saturated portion comprises a portion of the second bearing surface layer that is located in the vicinity of the second magnet, between the poles of the second magnet; and the unsaturated portion comprises a portion of the second bearing surface layer that is located in the vicinity of the poles of the second magnet.

16. The motor of claim 13 wherein: the first motor assembly is a stator; the first bearing surface layer comprises a bushing; the first magnet is an electromagnet, such that the first magnetic field can be selectively controlled; the second motor assembly comprises a shaft; the second bearing surface layer is located over at least a portion of the shaft; and the second magnet located within the shaft and comprises at least one permanent magnet.

17. The motor of claim 16 wherein, during normal operation of the motor, a portion of second bearing surface layer proximate to poles of the at least one permanent magnet are magnetically unsaturated and a portion of the second bearing surface layer located between the poles is magnetically saturated.

18. A magnetic motor comprising: a first motor assembly comprising: a first bearing surface layer, and a first magnet, fixed with respect to the first bearing surface layer, structured to generate a first magnetic field; and a second motor assembly comprising: a second solid bearing surface layer, located so that at least a portion of the second bearing surface layer is in contact with at least a portion of the first bearing surface layer, with the second bearing surface layer being anisotropic in its magnetic permeability, and a second magnet, fixed with respect to the second bearing surface layer, structured to generate a second magnetic field, with the first and second motor assemblies being structured so that forces caused by the interaction of the first and second magnetic fields will cause the first motor assembly and the second motor assembly to move relative to each other, and with the first and second bearing surface layers being in moving contact to at least partially guide the relative motion of the first and second motor assemblies.

19. The motor of claim 18 wherein: the first motor assembly is a stator; the first bearing surface layer comprises a bushing; the first magnet is an electromagnet, such that the first magnetic field can be selectively controlled; the second motor assembly comprises an elongated shaft defining a lengthwise direction and a radial direction; the second bearing surface layer is located over at least a portion of the shaft; and the second magnet located within the shaft and comprises at least one permanent magnet.

20. A magnetic motor comprising: a first motor assembly comprising: a first bearing surface layer, and a first magnet, fixed with respect to the first bearing surface layer, structured to generate a first magnetic field; and a second motor assembly comprising: a second bearing surface layer, located so that at least a portion of the second bearing surface layer is in contact with at least a portion of the first bearing surface layer, with the second bearing surface layer being anisotropic in its magnetic permeability, and a second magnet, fixed with respect to the second bearing surface layer, structured to generate a second magnetic field, with the first and second motor assemblies being structured so that forces caused by the interaction of the first and second magnetic fields will cause the first motor assembly and the second motor assembly to move relative to each other, with the first and second bearing surface layers being in moving contact to at least partially guide the relative motion of the first and second motor assemblies; wherein: the first motor assembly is a stator; the first bearing surface layer comprises a bushing; the first magnet is an electromagnet, such that the first magnetic field can be selectively controlled; the second motor assembly comprises an elongated shaft defining a lengthwise direction and a radial direction; the second bearing surface layer is located over at least a portion of the shaft; and the second magnet located within the shaft and comprises at least one permanent magnet; and wherein: a magnetic permeability of the second bearing surface layer in the radial direction is y; a magnetic permeability of the second bearing surface layer in the lengthwise direction is x; and y is greater than x.

21. The motor of claim 20 wherein y/x is greater than or equal to 1.5.

* * * * *